March 21, 1961 M. W. BUZZAN 2,976,125
ROTATING DRUM AMMONIATOR WITH INTERNAL MECHANICAL SCRAPER
Filed Sept. 12, 1957 2 Sheets-Sheet 1
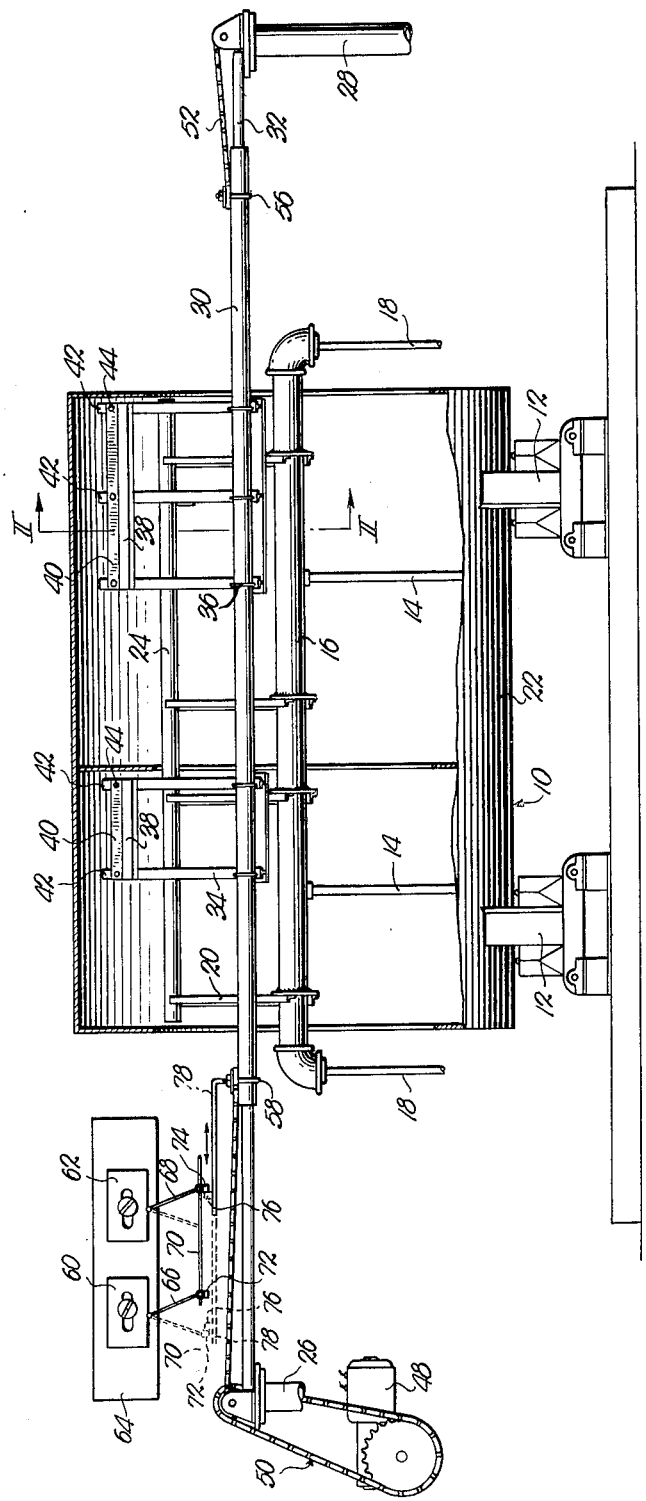
Fig. 1.
INVENTOR.
Murrel W. Buzzan
BY
ATTORNEYS

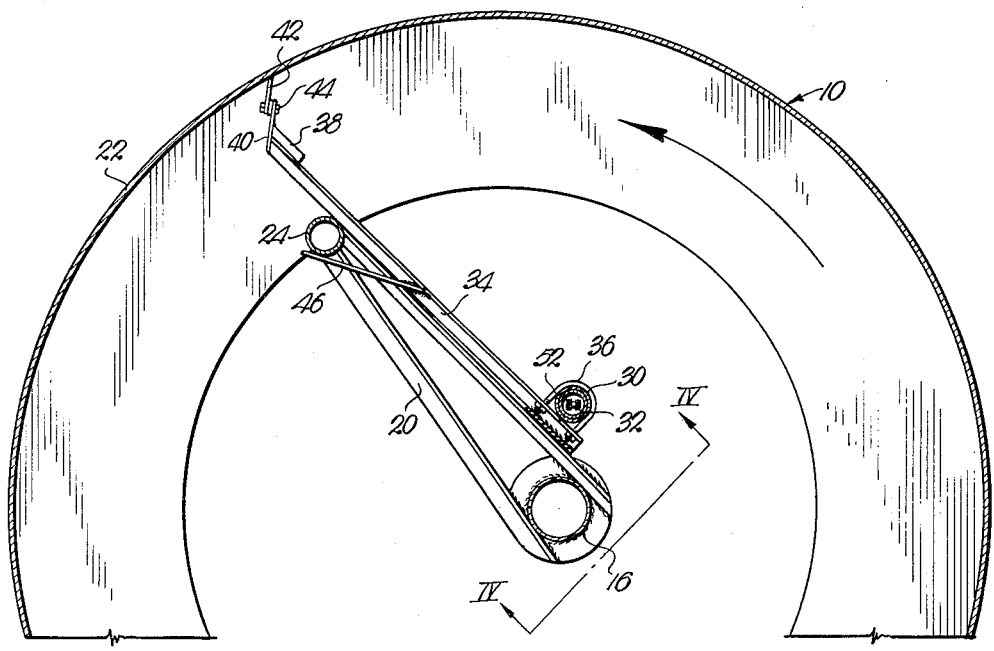

United States Patent Office

2,976,125
Patented Mar. 21, 1961

2,976,125

ROTATING DRUM AMMONIATOR WITH INTERNAL MECHANICAL SCRAPER

Murrel W. Buzzan, Gashland, Mo.
(624 E. 89th St. N., Kansas City 55, Mo.)

Filed Sept. 12, 1957, Ser. No. 683,621

5 Claims. (Cl. 23—259.1)

This invention relates to structure for removing material tending to collect and adhere to the walls of apparatus employed to intermix a number of ingredients or blend one or more ingredients into the batch, particularly through use of a rotatable drum.

The instant invention has particular adaptability in the manufacture of fertilizers. It is common practice to utilize a machine commonly referred to as an ammoniator for properly charging the batch with ammonia, but considerable difficulty has been experienced in collection of the materials upon the walls of the cylinder forming a part of the ammoniator and mounted for rotation about a horizontal axis.

While various attempts have heretofore been made to alleviate the problem, for the most part, scraper means utilized for such purpose are not satisfactory for the reason that they impart a drag upon the drum, thereby necessitating increased power requirements. More particularly however, the prior art devices with which I am familiar, are not satisfactory for the reason that the scrapers themselves collect the material and the ultimate result is an improper blending or admixture of the ammonia evenly and in proper proportions throughout the entire admixture.

It is accordingly the most important object of the present invention to provide a scraper assembly that alleviates all of the aforementioned problems of the prior art, particularly as relates itself to the unnecessary drag upon the cylinder and the undesired collection of the material on the scrapers themselves.

Another important object of the present invention is to provide a scraper assembly that permits the use of scrapers which are of themselves relatively small and, therefore, incapable of gathering large amounts of the material, all by virtue of the fact that the entire assembly is automatically reciprocated within the drum as the latter continues to rotate.

Other objects include the novel mechanism that is provided as a part of the scraper assembly for imparting reciprocable movement thereto; the way in which the scrapers themselves, the supports therefor, and the means for reciprocating the same are operably associated with the rotating drum; and many important details of construction including the way in which the support means for the scrapers is in turn slidably carried in the drum for reciprocation longitudinally thereof while permitting free rotation during continuous use of the ammoniator.

In the drawing:

Fig. 1 is an elevational view of a rotating drum ammoniator having an internal mechanical scraper assembly made pursuant to my present invention, the drum being broken away and in section to reveal details of construction.

Fig. 2 is a fragmentary, enlarged, cross-sectional view taken on line II—II of Fig. 1.

Fig. 3 is an enlarged, fragmentary, elevational view partially in section showing that end of the reciprocable structure opposite to the prime mover therefor; and Fig. 4 is an enlarged, fragmentary, elevational view taken along line IV—IV of Fig. 2 looking in the direction of the arrows.

The details of construction of the rotating drum ammoniator for producing commercial ammoniated fertilizer, are of no importance to the instant invention and, therefore, have not been illustrated nor need the operation of the apparatus be outlined. There is shown, however, a cylindrical drum 10 that is mounted for rotation about its longitudinal horizontally disposed axis in any suitable manner. For example, drum 10 may be supported on and between pairs of rollers 12 and be driven in any suitable manner (not shown).

Ammonia is directed into the fertilizer adjacent the bottom of the drum 10 through the medium of conduits 14 depending from a tubular manifold 16, the lower ends of the conduits 14 having suitable discharge nozzles or the like for properly feeding the ammonia to the material as the same moves from one end of the drum to the opposite end thereof. Tubular manifold 16 is preferably disposed adjacent the axis of rotation of the drum 10 and is supported in any suitable manner not shown, pipes 18 coupling therewith and leading from a source of the ammonia.

A plurality of spaced-apart arms 20 radial to manifold 16, are secured rigidly to the latter and extend upwardly at an angle toward the inner face of cylindrical wall 22 of drum 10 as shown in Figs. 1 and 2. Arms 20 support and are interconnected by a horizontal slide element 24 at the upper free ends of the arms 20. The element 24 may be tubular if desired as seen in Fig. 2 and disposed entirely within the drum 10.

A scraper assembly supported in part by the slide element 24 but primarily by suitable standards 26 and 28 exteriorly of the drum 10, includes a pair of tubes 30 and 32 that are relatively telescoped, it being noted that the tube 32 is longer than the tube 30 and extends through the latter. Any suitable means may be provided for rigidly mounting the horizontal tube 32 on the support means 26 and 28 preferably in parallelism with the axis of rotation of the drum 10.

The tube 30 on the other hand, is reciprocable on the tube 32 longitudinally of the latter and carries a plurality of elongated bars 34 tangential to the tube 30 and extending upwardly toward the inner face of wall 22 at substantially the same angle as arms 20.

Means such as U-bolts 36 are employed for rigidly attaching the lowermost ends of the bars 34 to the tube 30 in spaced relationship therealong. The upper ends of certain of the bars 34 are interconnected in pairs or otherwise by straps 38, which in turn support upstanding plates 40 and it is upon such plates 40 that a plurality of relatively small scrapers 42 are releasably mounted through use of suitable fasteners 44.

Notable particularly in Fig. 2, is the fact that the bars 34 rest upon and are freely slidable along the element 24 in a position where scrapers 42 engage or are held in juxtaposed relationship to the inner face of wall 22. It is to be preferred that one or more of the bars 34 be provided with an elongated keeper 46 extending into underlying slidable relationship to the element 24 to prevent swinging of the bars 34 away from the element 24 since no means is contemplated for positively holding the tube 30 against rotation relative to tube 32.

Reciprocable movement is imparted to the tube 30 relative to tube 32 and, therefore, to the bars 34 and the scrapers 42 thereon, by energization of a prime mover such as an electric motor 48 for actuating a chain and gear assembly 50. A chain 52 extends entirely through the tube 32 and is trained around an idler sprocket 54 at one end of tube 32 opposite to prime mover 48 as is shown in Fig. 3. One free end of the chain 52 is attached directly to the tube 30 at the proximal end of the latter in a suitable manner such as by use of a U-bolt 56. The opposite end of chain 52 is likewise trained over a sprocket (not shown) and attached to the opposite end of tube 30 by a fastener 58. It is the last-mentioned sprocket that is driven by the assembly 50.

Reversible motor 48 is provided with circuitry of any well-known characteristics adapted for control through the medium of a pair of switches 60 and 62 adjustably mounted in spaced-apart relationship on a support 64 that may in turn be supported in any desired fashion not shown. Swingable arms 66 and 68 of switches 60 and 62 respectively are pivotally ganged together by a bar 70 that is in turn provided with spaced projections 72 and 74. The projections 72 and 74 are disposed within the path of travel of a third projection 76 interposed between the projections 72 and 74 and extending upwardly from an L-shaped rod 78 that is secured to the pipe 30 for reciprocation therewith.

While the operation of the improvements of the instant invention are obvious from the above description of its components, it may be briefly pointed out that as soon as the drum 10 is caused to rotate, and the ammoniating procedure commenced, motor 48 is energized through closing of a master switch (not shown) and that operation of motor 48 imparts reciprocable movement to the tube 30.

When the switch arms 66 and 68 are in the position illustrated in Fig. 1, the tube 30 moves toward the support 26 until projection 76 moves into contact with the projection 72, thereby swinging the switch arms 66 and 68 to the opposite ends of their paths of travel. This reverses the motor 48 causing the tube 30 to return to the position shown in Fig. 1. Such reciprocable movement is imparted to the scrapers 42 and the latter are effective in removing any material that collects on the inner face of wall 22 without the scrapers 42 themselves unduly collecting a large amount of the material on themselves and without imparting a drag upon the drum 10 to require additional power in order to rotate the same in the direction of the arrow shown in Fig. 2.

Having thus described the invention what is claimed as new and desired to be secured by Letters Patent is:

1. In a rotating drum type ammoniator, the combination of an elongated drum having a cylindrical wall; means mounting said drum for rotation about an axis concentric with said wall; a scraper assembly including an elongated, rigid, shiftable member parallel with said axis of rotation; means mounting said member for reciprocation in either direction along the longitudinal axis of said member; laterally extending arm means mounted on said member within the drum; scraper means on said arm means engaging the inner face of said wall; and means operably connected with said member for reciprocating the same alternately in said directions during rotation of the drum.

2. In a rotating drum type ammoniator, the combination of an elongated drum having a cylindrical wall; means mounting said drum for rotation about an axis concentric with said wall; a scraper assembly including an elongated, rigid, shiftable member parallel with said axis of rotation; means mounting said member for reciprocation in either direction along the longitudinal axis of said member; laterally extending arm means mounted on said member within the drum; scraper means on said arm means engaging the inner face of said wall; means operably connected with said member for reciprocating the same alternately in said directions during rotation of the drum; and an elongated, stationary element in the drum parallel with said member between the latter and said wall slidably supporting the arm means and holding the latter against rotation in the direction of rotation of the drum.

3. In a rotating drum type ammoniator, the combination of an elongated drum having a cylindrical wall; means mounting said drum for rotation about an axis concentric with said wall; a scraper assembly including a rigid, elongated support parallel with said axis of rotation; a tubular member slidably telescoped on said support for reciprocation in either direction along the longitudinal axis of said member; laterally extending arm means mounted on said member within the drum; scraper means on said arm means engaging the inner face of said wall; and means operably connected with said member for reciprocating the same alternately in said directions during rotation of the drum.

4. In a rotating drum type ammoniator, the combination of an elongated drum having a cylindrical wall; means mounting said drum for rotation about an axis concentric with said wall; a scraper assembly including a rigid, elongated, tubular support parallel with said axis of rotation; a tubular member slidably telescoped on said support for reciprocation in either direction along the longitudinal axis of said member; laterally extending arm means mounted on said member within the drum; scraper means on said arm means engaging the inner face of said wall; and means operably connected with said member for reciprocating the same alternately in said directions during rotation of the drum, including a flexible device extending through the support and having the ends thereof connected to the member at each end respectively of the latter.

5. In a rotating drum type ammoniator, the combination of an elongated drum having a cylindrical wall; means mounting said drum for rotation about an axis concentric with said wall; a scraper assembly including a rigid, elongated, tubular support parallel with said axis of rotation; a tubular member slidably telescoped on said support for reciprocation in either direction along the longitudinal axis of said member; laterally extending arm means mounted on said member within the drum; scraper means on said arm means engaging the inner face of said wall; and means operably connected with said member for reciprocating the same alternately in said directions during rotation of the drum, including a chain extending through the support and having the ends thereof connected to the member at each end respectively of the latter, a reversible electric motor coupled with the chain for shifting the latter in either direction, switch means for controlling the direction of operation of the motor, and means on the member for controlling the switch means.

References Cited in the file of this patent
UNITED STATES PATENTS

| | | |
|---|---|---|
| 891,327 | Clark et al. | Mar. 30, 1908 |
| 1,095,591 | Omer et al. | May 5, 1914 |
| 2,710,423 | Douglas | June 14, 1955 |
| 2,880,074 | Carmichael | Mar. 31, 1959 |